United States Patent [19]
Shih

[11] Patent Number: 5,359,622
[45] Date of Patent: Oct. 25, 1994

[54] RADIAL POLARIZATION LASER RESONATOR

[75] Inventor: Chun-Ching Shih, Palos Verdes Estates, Calif.

[73] Assignee: TRW Inc., Redondo Beach, Calif.

[21] Appl. No.: 54,426

[22] Filed: Mar. 30, 1993

[51] Int. Cl.$^5$ .............................................. H01S 3/08
[52] U.S. Cl. ..................................... 372/108; 372/106
[58] Field of Search ................ 372/108, 19, 106, 103

[56] References Cited

U.S. PATENT DOCUMENTS

| | | | |
|---|---|---|---|
| 3,777,280 | 12/1973 | Pohl | 372/19 |
| 4,294,509 | 10/1981 | Nagao | 385/36 |
| 4,496,518 | 1/1985 | Marie | 372/19 |
| 4,531,216 | 7/1985 | Tyler | 372/106 |
| 4,755,027 | 7/1988 | Schäfer | 359/487 |

Primary Examiner—Rodney B. Bovernick
Assistant Examiner—Robert E. Wise

[57] ABSTRACT

A laser resonator is provided for producing a radially polarized laser beam. The laser resonator includes an active laser medium disposed between a highly reflective end mirror and an opposing partial transmission mirror which define a laser resonator cavity therebetween for producing oscillating optical radiation. A conical Brewster window is further located within the laser resonator cavity and has an optically transparent medium oriented in accordance with the polarizing (i.e., Brewster) angle. As the optical radiation oscillates within the resonator cavity, the conical Brewster window causes the radiation transmitted therethrough to have a radial polarization. Accordingly, the laser resonator produces a laser output which has a radially polarized electric field associated therewith.

20 Claims, 1 Drawing Sheet

RADIAL POLARIZATION LASER RESONATOR

BACKGROUND OF THE INVENTION

1. Technical Field

This invention relates generally to laser systems and, more particularly, to a laser resonator for producing a radially polarized laser beam.

2. Discussion

The polarization of a laser beam is a characteristic in which the electric field thereof is controlled usually with respect to the propagation direction of the beam. Different types of polarization exist which are commonly selected so that the electric field is oriented in a predictable fashion, depending on the particular application. For instance, conventional laser systems have been developed which commonly generate a linearly polarized beam. According to such conventional approaches, the linear polarization is generally accomplished by employing a flat planar Brewster window oriented at the Brewster angle (i.e., polarizing angle) within the lasing region. The planar Brewster window is typically made of a transparent dielectric material such as glass or dichroic material which has a known index of refraction. Accordingly, light with a polarization parallel to the incidence plane of the Brewster window is transmitted therethrough, while light with a polarization normal thereto is generally reflected therefrom.

In the past, other types of polarization have been produced which include circular polarization and elliptical polarization, which are normally produced by combining a linear polarizer with a wave plate such as a quarter wave plate or Fresnel rhomb. However, in more recent years, developments in the areas of holography, interferometry, spectroscopy, photochemistry and accelerator technology now and in the future may require laser beams in a special polarization state known as radial polarization. In particular, a radially polarized laser beam can advantageously be focused by axicon-type optics so as to generate a very strong longitudinal electromagnetic field in the focal region thereof. In effect, radially polarized laser beams could therefore be used to provide an accelerating mechanism for present and future-generation high energy accelerators.

Currently, existing laser systems have been able to generate radial polarization beams to a limited extent by using very complex optical schemes. Such optical schemes generally involve converting a linearly polarized beam into a radially polarized beam through a series of beam rotations and combinations with external conversion systems. However, such external conversion systems are rather complicated since the conversion generally requires special optical elements such as a spiral waveplate which is generally very difficult to fabricate in the optical region. In addition, prior approaches generally require a substantially uniform beam profile which in turn results in rather stringent requirements.

It is therefore desirable to provide for an enhanced approach for obtaining a laser output beam which has a radial polarization. More particularly, it is desirable to provide a laser resonator that produces a direct radial polarization laser output beam without the need for any complex external conversion optics. In addition, it is desirable to provide for such a direct radial polarization laser output beam which may be easily achievable with existing laser systems by equipping such systems with a conical Brewster window as described hereinafter.

SUMMARY OF THE INVENTION

In accordance with the teachings of the present invention, a laser resonator is provided for producing a radially polarized laser output beam. The laser resonator includes an active laser medium disposed between a highly reflective end mirror and a partial transmission mirror which forms a laser resonator cavity for producing oscillating optical radiation. A conical Brewster window is further disposed within the laser resonator cavity between the mirrors and has a conical shaped transparent surface oriented at the Brewster angle so as to cause the oscillating optical radiation to have a radial polarization. The oscillating optical radiation builds up to a desired power level and is then output through partial transmission mirror as a radially polarized laser output beam.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
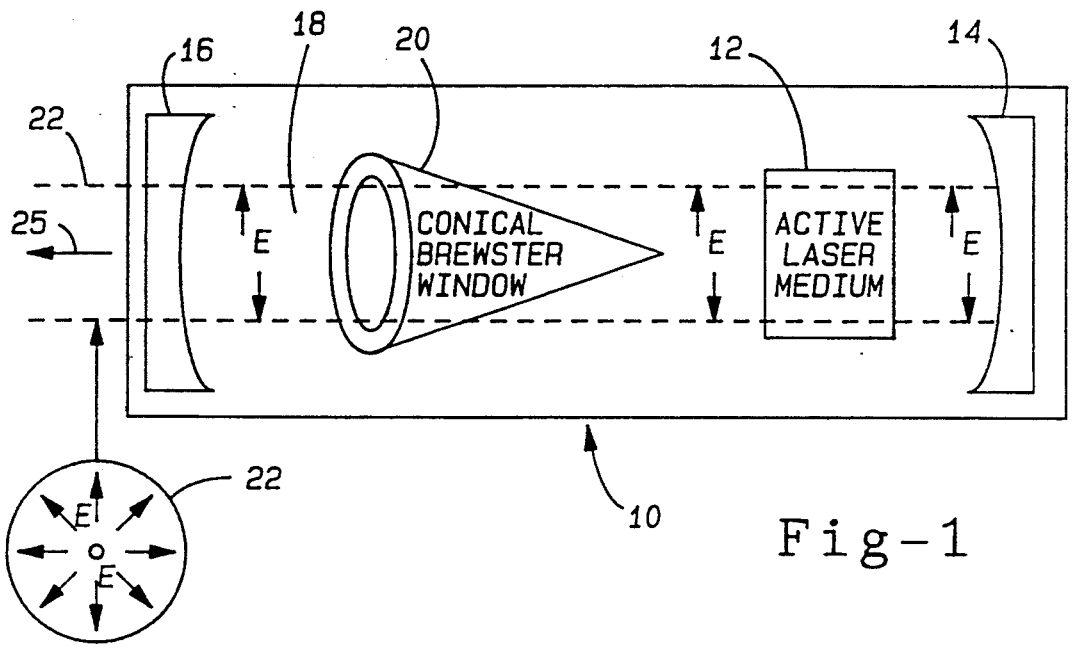
FIG. 1 is a block diagram which illustrates a laser resonator for producing a radial polarization laser beam in accordance with the present invention.
Figure 2:
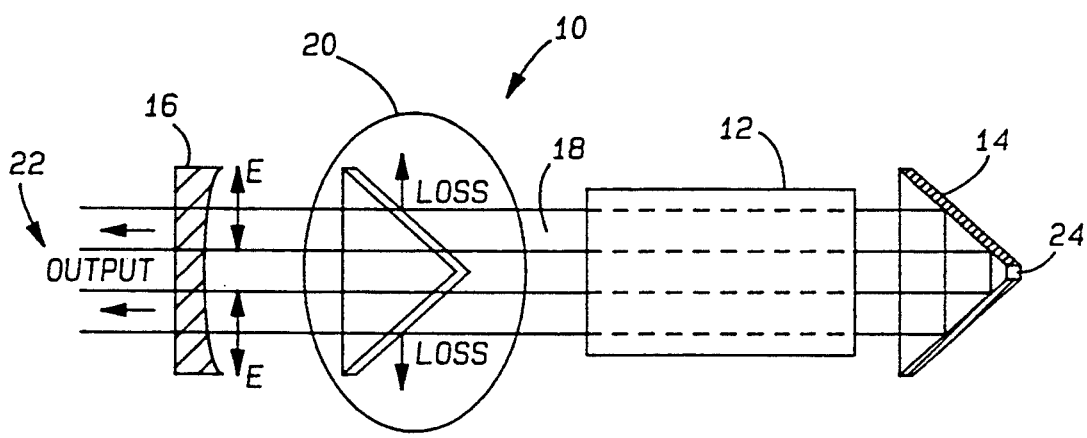
FIG. 2 is a cross-sectional view of the radial polarization laser resonator according to the present invention taken along a longitudinal plane extending through the center thereof.

Turning now to FIGS. 1 and 2, a laser resonator 10 is shown therein for producing a radially polarized laser output beam 22 according to the present invention. In general, the laser resonator 10 includes an active laser gain medium 12 disposed between a pair of opposing reflective resonator mirrors 14 and 16. Together, gain medium ! 2 and resonator mirrors 14 and 16 make up the basic essential elements of a conventional laser resonator which define a laser resonator cavity 18 for producing an oscillating stimulated emission of optical radiation. While the present invention is described herein in accordance with such a laser arrangement for achieving a stimulated emission of optical radiation which exhibits radial polarization, it is conceivable that other laser arrangements may be employed without departing from the invention.

The active laser gain medium 12 includes an amplifying medium for producing a stimulated emission of optical radiation by stimulating atoms found therein into an excited state. Gain medium 12 may include an active solid-state light amplifying material such as a rod of Nd:YAG (neodymium/yttrium-aluminum-garnet). The Nd:YAG is essentially optically pumped by an incoherent optical light beam to stimulate the atoms present therein so as provide amplified optical radiation. Alternately, gain medium 12 may include a gas-discharge material such as argon which generally uses nonequilibrium processes to stimulate the necessary radiation. Such optical amplifying materials are generally well known to one of ordinary skill in the art for providing a laser gain that is sufficient to achieve a high power laser output beam. However, other optical amplifying materials may be employed to provide the gain medium 12 for purposes of providing the stimulated emission, especially to achieve other optical wavelengths.

Reflective resonator mirrors 14 and 16 are arranged opposing one another on opposite sides of laser gain medium 12 and define the laser resonator cavity 18 as the reflective region therebetween extending along a longitudinal beam axis 25. According to this arrangement, optical radiation that is directed along axis 25 is repetitively reflected back and forth (i.e., oscillates) between resonator mirrors 14 and 16. The oscillating radiation remains in the laser resonator cavity 18 long enough to build up a strong oscillation according to the desired output.

Reflective resonator mirror 14 is a highly reflective conical-shaped end mirror which may include a small opening 24 located at the vertex thereof. Use of a conical end mirror has the advantage of significantly reducing resonator alignment sensitivity. Opening 24 is provided for purposes of eliminating problems commonly associated with manufacturing a perfect reflective conical surface. This is because it is generally very difficult to acheive a precisely formed reflective surface in the vicinity of the vertex. Opening 24 has a negligible effect on the radiation because the laser cavity mode with a radial polarization under ideal circumstances has zero intensity near the symmetry axis 25.

Reflective resonator mirror 16 is a partial transmission mirror which operates to reflect a substantial amount of reflecting radiation back toward the opposing reflective end mirror 14, while allowing a portion of the power in laser resonator cavity 18 to pass therethrough as a laser output 22. That is, partial transmission mirror 16 operates both as a reflection mirror and also an output transmission medium. In so doing, partial transmission mirror 16 provides approximately a ninety-eight to ninety-nine percent (98-99%) effective reflection of the oscillating radiation incident thereto along beam axis 25, while allowing the remaining one to two percent (1-2%) of the oscillating radiation incident thereto to effectively pass therethrough along beam axis 25 as the laser output beam 22.

According to the present invention, a conical Brewster window 20 is located in laser resonator cavity 18 between opposing reflective end mirror 14 and partial transmission mirror 16. The conical Brewster window 20 is preferably made up of a transparent dielectric material such as glass or other transparent materials that have similar optical transmission characteristics. Such materials exhibit a known index of refraction and are capable of controlling the transmission of an optical signal therethrough based on the polarization direction of the optical signal.

It is generally known that an optical beam directed incident to such transparent materials will refract portions of the optical beam which have the proper polarization direction, while reflecting remaining portions thereof. According to the well known theory of Brewster's law, under ideal circumstances, light generally exhibits complete transmission at the Brewster angle (i.e., polarizing angle) $\theta = \tan^{-1} n$, where n is the index of refraction of the transparent material. Accordingly, optical radiation with a polarization directed along the incidence plane will have a substantially complete transmission therethrough, while light with a polarization normal to the incidence will be partially reflected therefrom.

Figure 3:
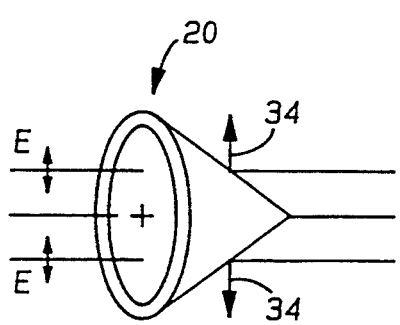
FIG. 3 is a schematic representation of a conical Brewster window as used in accordance with the present invention.
Figure 4:
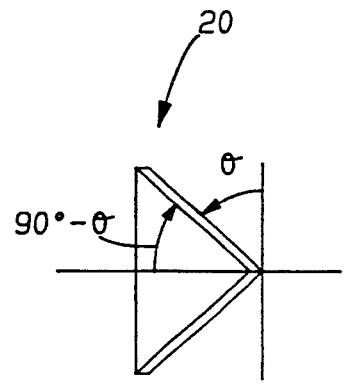
FIG. 4 is a cross-sectional side view of the conical Brewster window taken through a center portion thereof.

With particular reference to FIGS. 3 and 4, the conical Brewster window 20 is further shown in more detail. Conical Brewster window 20 has an optically transparent surface in the shape of a right circular cone which includes a vertex and an open circular base end along a base plane. The conical Brewster window 20 is oriented in laser resonator cavity 18 so that the vertex is aligned with the center of the circular base end along beam axis 25. The conical surface has an elevational rise from beam axis 25 along an angle of $(90° - \theta)$ throughout a complete rotation about axis 25. According to one particular example, conical Brewster window 20 may employ an optically transparent material such as glass which has a known index of refraction of approximately (n=1.5). Accordingly, the glass therefore provides a maximum transmission of radial polarization at an angle of approximately fifty-six degrees ($\theta = 56°$).

As the reflecting radiation oscillates within the laser resonator cavity 18, the optical radiation is repetitively transmitted back and forth through conical Brewster window 20. The optical radiation with an electric field E oriented in a radial direction relative to the direction of propagation is continually allowed to pass therethrough. Optical radiation which has the electric field E oriented in a non-radial orientation is partially reflected out of the resonator cavity 18 by the conical Brewster window 20. The radially polarized radiation continues to oscillate back and forth in resonator cavity 18 until such radiation is transmitted through partial transmission mirror 16. Thus, the continued oscillation of radiation through the conical Brewster window 20 ensures that a substantial amount of the optical radiation transmitted as laser output beam 22 has a radial polarization.

The present invention is particularly well suited to be easily implemented with a number of existing laser systems without the need for complex external conversion systems. For instance, this may be accomplished by replacing the planar Brewster window 20 that is commonly found with many linearly polarized lasers with the conical Brewster window 20 described herein.

In operation, laser resonator 10 operates such that the active laser-gain medium 12 generates a stimulated emission of optical radiation which in turn oscillates between highly reflective end mirror 14 and opposing partial transmission mirror 16 within laser resonator cavity 18. According to this resonator mirror arrangement, the oscillating optical radiation propagates within resonator cavity 18 so as to build up power and begin to lase. When the optical radiation reaches a large enough intensity, the partial transmission mirror 16 transmits a portion of the radiation therethrough as an output in the form of laser output beam 22.

While oscillating within laser resonator cavity 18, the optical radiation is repetitively transmitted back and forth through the conical Brewster window 20. As the optical radiation passes through conical Brewster window 20, electric field components E which are oriented in a radial direction relative to the laser beam direction of propagation, are allowed to pass through conical Brewster window 20. The remaining portions of the radiation 34 are reflected from the conical Brewster window 20 to an area outside the laser cavity 18 and therefore generally dissipate as energy, loss. As a consequence, laser output 22 exhibits a radial polarization in which the electric field E thereon is oriented in a substantially radial direction.

According to the present invention, laser resonator 10 advantageously provides for radial polarization by employing a conical Brewster window 20 within laser resonator cavity 18 without the requirements of complex external optical devices. Using this approach, one may easily achieve a radially polarized beam which exhibits an accelerating gradient order of magnitude as high as 1 GV/m or even higher magnitudes. Such an optical beam may advantageously be employed for providing a superior acceleration mechanism for present and future accelerators.

In view of the foregoing, it can be appreciated that the present invention enables the user to achieve a laser resonator 10 which produces a radially polarized laser beam 22. Thus, while this invention has been disclosed herein in combination with a particular example thereof, no limitation is intended thereby except defined in the following claims. This is because a skilled practitioner recognizes that other modifications can be made without departing from the spirit of this invention after studying the specification and drawings.

What is claimed is:

1. A laser resonating system for generating a radially polarized laser output comprising:
    source means including an active laser medium comprising neodymium for providing a stimulated emission of optical radiation;
    resonator means including a resonator cavity in which said optical radiation may oscillate therein;
    an optically transparent medium disposed within said resonator cavity and having a conical surface oriented in accordance with a polarizing angle for transmitting radial polarization therethrough; and
    output means for providing a radially polarized laser beam.

2. The laser system as defined in claim 1 wherein said optically transparent medium has a known index of refraction and said polarizing angle is dependent on said index of refraction.

3. The laser system as defined in claim 2 wherein said polarizing angle is $\theta = \tan^{-1} n$, where n represents said index of refraction.

4. The laser system as defined in claim 1 wherein said resonator means comprises:
    a highly reflective end mirror; and
    a partial transmission mirror opposing said reflective end mirror.

5. The laser system as defined in claim 4 wherein said output means comprises said partial transmission mirror in which said output beam is transmitted therethrough.

6. The laser system as defined in claim 4 wherein said highly reflective end mirror has a substantially conical shape reflective surface.

7. The laser system as defined in claim 6 wherein said highly reflective end mirror has an opening formed in the center region of said conical shape reflective surface.

8. The laser system as defined in claim 1 wherein said optically transparent medium comprises glass.

9. The laser system as defined in claim 1 wherein said active laser medium comprises Nd:YAG which is optically pumped.

10. The laser system as defined in claim 1 wherein said active laser medium comprises gas.

11. In a laser resonator having an active laser medium disposed within a resonator cavity for producing a stimulated emission of optical radiation and an output for providing a laser beam, further comprising:
    an optically transparent medium disposed within said resonator cavity and having a conical surface oriented in accordance with a polarizing angle for transmitting radial polarization therethrough, wherein said optically transparent medium comprises glass.

12. The laser resonator as defined in claim 11 wherein said optically transparent medium comprises a conical Brewster window for transmitting radially polarized radiation therethrough while reflecting non-radial polarized radiation away from said cavity.

13. The laser resonator as defined in claim 11 wherein said optically transparent medium has a known index of refraction (n) and said polarizing angle is the Brewster angle $\theta = \tan^{-1} n$.

14. The laser resonator as defined in claim 11 wherein said resonator means comprises:
    a highly reflective end mirror; and
    a partial transmission mirror opposing said reflective end mirror.

15. A radial polarization laser resonator comprising:
    a highly reflective end mirror having a substantially conical shape reflective surface;
    a partial transmission mirror having a partially reflective surface facing the end mirror and so as to form a resonator cavity therebetween, said partial transmission mirror further transmitting radiation therethrough to provide a laser output;
    an active laser medium disposed within said resonator cavity; and
    a conical Brewster window disposed within said resonator cavity and having an optically transparent conical surface oriented in accordance with a polarizing angle for producing radial polarization.

16. The laser resonator as defined in claim 15 wherein said optically transparent medium has a known index of refraction (n) and said polarizing angle is dependent on said index of refraction.

17. The laser resonator as defined in claim 16 wherein said polarizing angle is substantially equal to the Brewster angle $\theta = \tan^{-1} n$.

18. A method for producing a radially polarized laser beam comprising:
    actively producing a stimulated emission of optical radiation by optically pumping ND:YAG;
    oscillating said optical radiation within a resonator cavity; and
    transmitting said optical radiation through a conical Brewster window having an optically transparent conical surface at a polarizing angle so as to produce a radially polarized output beam.

19. A radial polarization laser resonator comprising:
    a highly reflective end mirror;
    a partial transmission mirror having a partially reflective surface facing the end mirror and so as to form a resonator cavity therebetween, said partial transmission mirror further transmitting radiation therethrough to provide a laser output;
    an active laser medium including optically pumped ND:YAG disposed within said resonator cavity; and
    a conical Brewster window disposed within said resonator cavity and having an optically transparent conical surface oriented in accordance with a polarizing angle for producing radial polarization.

20. The laser resonator as defined in claim 19 wherein said highly reflective mirror has a substantially conical shape reflective surface.

* * * * *